United States Patent
Furumi

(10) Patent No.: US 9,939,720 B2
(45) Date of Patent: Apr. 10, 2018

(54) PROJECTOR AND METHOD FOR CONTROLLING THE SAME

(71) Applicant: Seiko Epson Corporation, Tokyo (JP)

(72) Inventor: Yoshiyuki Furumi, Asahi-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/406,889

(22) Filed: Jan. 16, 2017

(65) Prior Publication Data

US 2017/0205697 A1    Jul. 20, 2017

(30) Foreign Application Priority Data

Jan. 20, 2016    (JP) ................. 2016-008774

(51) Int. Cl.
*G03B 21/20* (2006.01)
*G03B 21/16* (2006.01)
*G03B 21/14* (2006.01)

(52) U.S. Cl.
CPC ....... *G03B 21/2053* (2013.01); *G03B 21/142* (2013.01); *G03B 21/16* (2013.01)

(58) Field of Classification Search
CPC ...... G03B 21/14; G03B 21/142; G03B 21/16; G03B 21/2053
See application file for complete search history.

(56) References Cited

U.S. PATENT DOCUMENTS 8,721,089 B2 *  5/2014  Hatakeyama ........ G03B 21/142
                                                  348/744

FOREIGN PATENT DOCUMENTS

JP    2013-242496 A    12/2013
JP    2014-38129 A     2/2014

* cited by examiner

*Primary Examiner* — William C Dowling
(74) *Attorney, Agent, or Firm* — ALG Intellectual Property, LLC

(57) ABSTRACT

Damage due to heat in a case where a projection lens having lower heat resistance performance is used is avoided.

A control section controls a light source drive section in such a way that the output from a light source is allowed to be increased up to a first value in a case where a projection lens is a first projection lens and controls the light source drive section in such a way that the output from the light source is allowed to be increased up to a second value different from the first value in a case where the projection lens is a second projection lens having heat resistance performance different from that of the first projection lens.

8 Claims, 3 Drawing Sheets

| TYPE OF PROJECTION LENS | MAXIMUM LUMINANCE a |
|---|---|
| LENS s1 | LUMINANCE a1 |
| LENS s2 | LUMINANCE a2 |
| LENS s3 | LUMINANCE a3 |
| ⋮ | ⋮ |

| TYPE s1 OF PROJECTION LENS ||
|---|---|
| ZOOM RATIO | MAXIMUM LUMINANCE a |
| RATIO r1 | LUMINANCE a11 |
| RATIO r2 | LUMINANCE a12 |
| RATIO r3 | LUMINANCE a13 |
| ⋮ | ⋮ |

PROJECTOR AND METHOD FOR CONTROLLING THE SAME

CROSS-REFERENCE

The entire disclosure of Japanese Patent Application No. 2016-008774, filed Jan. 20, 2016 is expressly incorporated by reference herein.

BACKGROUND

1. Technical Field

The present invention relates to control according to a projection lens of a projector.

2. Related Art

There is a known image projection apparatus, such as a liquid crystal projector that allows replacement of a projection lens. For example, JP-A-2014-38129 describes that information on the brightness of a projection lens is read and target lamp power necessary for projection at target brightness is calculated on the basis of the brightness information.

Heat resistance performance of a projection lens varies in accordance of the type thereof. For example, it is not preferable to perform projection with the output from a light source maximized when a projection lens having low heat resistance performance is used. However, it is cumbersome for a user to so operate a projector as not to increase the output from the light source in consideration of the heat resistance performance of the projection lens.

SUMMARY

An advantage of some aspects of the invention is to provide a technology for preventing damage due to heat in a case where a projection lens having lower heat resistance performance is used.

An aspect of the invention provides a projector including a light source that emits light, a light source drive section that controls output from the light source, a projection section that includes a projection lens through which the light passes and projects the light on a projection surface, and a control section that controls the light source drive section in such a way that the output from the light source is allowed to be increased up to a first value in a case where the projection lens is a first projection lens and controls the light source drive section in such a way that the output from the light source is allowed to be increased up to a second value different from the first value in a case where the projection lens is a second projection lens different from the first projection lens.

According to the projector described above, damage due to heat that occurs in a case where a projection lens having low heat resistance performance is used can be avoided.

The control section may set, on a menu screen where a user sets the output from the light source, a maximum value of settable output from the light source at the first value in the case where the projection lens is the first projection lens and set the maximum value of the settable output from the light source at the second value in the case where the projection lens is the second projection lens.

According to the projector with this configuration, on the menu screen where the output from the light source is set, the maximum value of the settable output from the light source can be changed in accordance with heat resistance performance of the projection lens.

In a case where the output from the light source having been set is greater than the second value when the first projection lens is replaced with the second projection lens, the control section may set the output from the light source at the second value.

According to the projector with this configuration, the output from the light source having been set can be changed in accordance with the projection lens.

The control section may control the light source drive section in such a way that the output from the light source varies in accordance with a zoom ratio of the projection lens.

According to the projector with this configuration, the output from the light source can be changed also in accordance with the zoom ratio of the projection lens.

Another aspect of the invention provides a method for controlling a projector including a light source that emits light, a light source drive section that controls output from the light source, and a projection section that includes a projection lens through which the light passes and projects the light on a projection surface, the method including controlling the light source drive section in such a way that the output from the light source is allowed to be increased up to a first value in a case where the projection lens is a first projection lens and controlling the light source drive section in such a way that the output from the light source is allowed to be increased up to a second value different from the first value in a case where the projection lens is a second projection lens different from the first projection lens.

According to the control method described above, damage due to heat that occurs in the case where a projection lens having low heat resistance performance is used can be avoided.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. Configuration

Figures 1, 2:
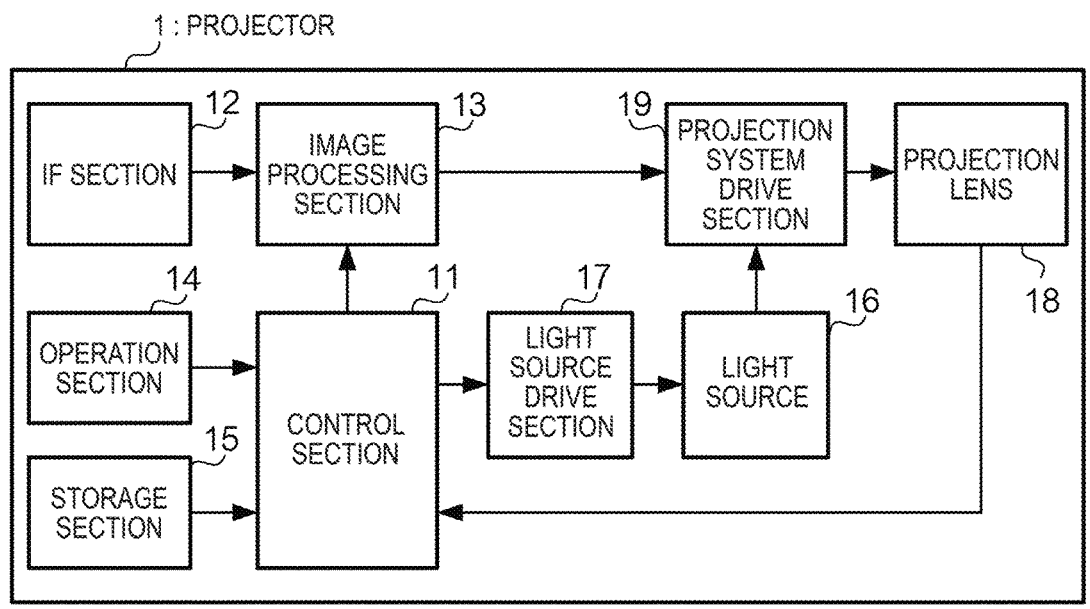
FIG. 1 shows the hardware configuration of a projector according to an embodiment.
FIG. 2 shows an example of a luminance table stored in the projector.

FIG. 1 shows the hardware configuration of a projector 1 by way of example. In the example, the projector 1 is what is called a single-focal-length projector and projects an image on a wall surface that serves as a projection surface. The projector 1 includes a control section 11, an IF section 12, an image processing section 13, an operation section 14, a storage section 15, a light source 16, a light source drive section 17, a projection lens 18, and a projection system drive section 19.

The control section 11 includes a CPU (central processing unit), a RAM (random access memory) that is a volatile storage device for temporarily storing a variety of data and other pieces of information, a ROM (read only memory) that is a nonvolatile storage device for storing a program and other pieces of information, and other components. The action of the projector 1 is controlled by the CPU that operates in accordance with the program stored in the ROM.

The IF section 12 is an interface that allows transmission and reception of signals or data to and from an external apparatus, such as a personal computer and a tablet. The IF section 12 includes terminals (for example, VGA terminal, USB terminal, wired LAN interface, S terminal, RCA terminal, HDMI (high-definition multimedia interface, registered trademark) terminal, and microphone terminal) and a wireless LAN interface that allow transmission and reception of the signals or data to and from the external apparatus. These terminals may include a video output terminal in addition to a video input terminal.

The image processing section 13 performs predetermined image processing (for example, size change and trapezoidal correction or adjustment of image quality, such as brightness, contrast, sharpness, and color tone) on a video signal inputted from the external apparatus.

The operation section 14 is an input device that allows a user to input an instruction to the projector 1 and includes, for example, a keypad, buttons, or a touch panel.

The storage section 15 is, for example, a hard disk drive, which is a nonvolatile storage device, and stores a variety of data and programs. The storage section 15 stores a luminance table shown, for example, in FIG. 2. The luminance table relates the type of each projection lens to maximum luminance of the light source 16 (that is, output from light source 16) so set as not to cause damage due to heat in consideration of the heat resistance performance of the projection lens. In the example shown in FIG. 2, the projection lens 18 having a projection lens type s1 is allowed to receive luminance up to maximum luminance (that is, output from light source) a1, the projection lens 18 having a projection lens type s2 is allowed to receive luminance up to maximum luminance (that is, output from light source) a2, and the projection lens 18 having a projection lens type s3 is allowed to receive luminance up to maximum luminance (that is, output from light source) a3.

The light source 16 is a section that outputs light and is, for example, a lamp, such as an ultrahigh-pressure mercury lamp, a halogen lamp, or a metal halide lamp, or a solid-state light source, such as an LED (light emitting diode) or a laser diode. The light source drive section 17 controls the output from the light source 16 (that is, luminance of light emitted from light source 16) on the basis of an instruction from the control section 11.

The projection system drive section 19 includes a lens shift driver, a zoom lens driver, and a light modulator. The lens shift driver is formed of a motor, a gear, and other components that move the projection lens 18 and moves the projection lens 18 on the basis of an instruction from the control section 11 to change the position where a projection image is projected. The direction in which the projection lens 18 is movable by the lens shift operation includes the upward, downward, rightward, and leftward directions and oblique directions with respect to an initial position (default position). The zoom lens driver is formed of a zoom adjustment motor and a focus adjustment motor that drive a lens group in a zoom lens. The zoom lens is formed of lens groups each including a plurality of lenses, and action of the zoom lens allows enlargement and reduction of a projection image on the projection surface and focus adjustment of the projection image. The light modulator is a device that modulates the light emitted from the light source 16 in accordance with the video signal and has, for example, a liquid crystal panel or a DMD (digital mirror device) and a drive circuit that drives the liquid crystal panel or the DMD. In this case, the light emitted from the light source 16 is separated by a dichroic mirror or any other component into RGB color light fluxes, which are then incident on the light modulator, where liquid crystal panels or other components for the three colors provided in the light modulator modulate the three color light fluxes, and the modulated light fluxes are combined with one another by a cross dichroic prism.

The projection lens 18 is a lens through which the light emitted from the light source 16 passes and is configured to be replaceable with several types of lenses different from one another in terms of optical specifications. The heat resistance performance of the projection lens 18 varies in accordance with the type thereof. The projection lens 18 and the projection system drive section 19 function as a projection section that projects light on the projection surface.

In the configuration described above, the control section 11 controls the light source drive section 17 in such a way that the output from the light source 16 can be increased up to a first value (that is, sets the maximum output from the light source 16 controlled by the light source drive section 17 at the first value) in a case where the projection lens 18 is a first projection lens, whereas the control section 11 controls the light source drive section 17 in such a way that the output from the light source 16 can be increased up to a second value different from the first value (that is, sets the maximum output from the light source 16 controlled by the light source drive section 17 at the second value) in a case where the projection lens 18 is a second projection lens different from the first projection lens. More specifically, the control section 11 controls the light source drive section 17 in such a way that the output from the light source 16 can be increased up to the first value, which is greater than the second value, in the case where the projection lens 18 is the first projection lens, which has high heat resistance performance, whereas the control section 11 controls the light source drive section 17 in such a way that the output from the light source 16 can be increased up to the second value, which is smaller than the first value, in the case where the projection lens 18 is the second projection lens, which has low heat resistance performance.

2. Action

Figure 3:
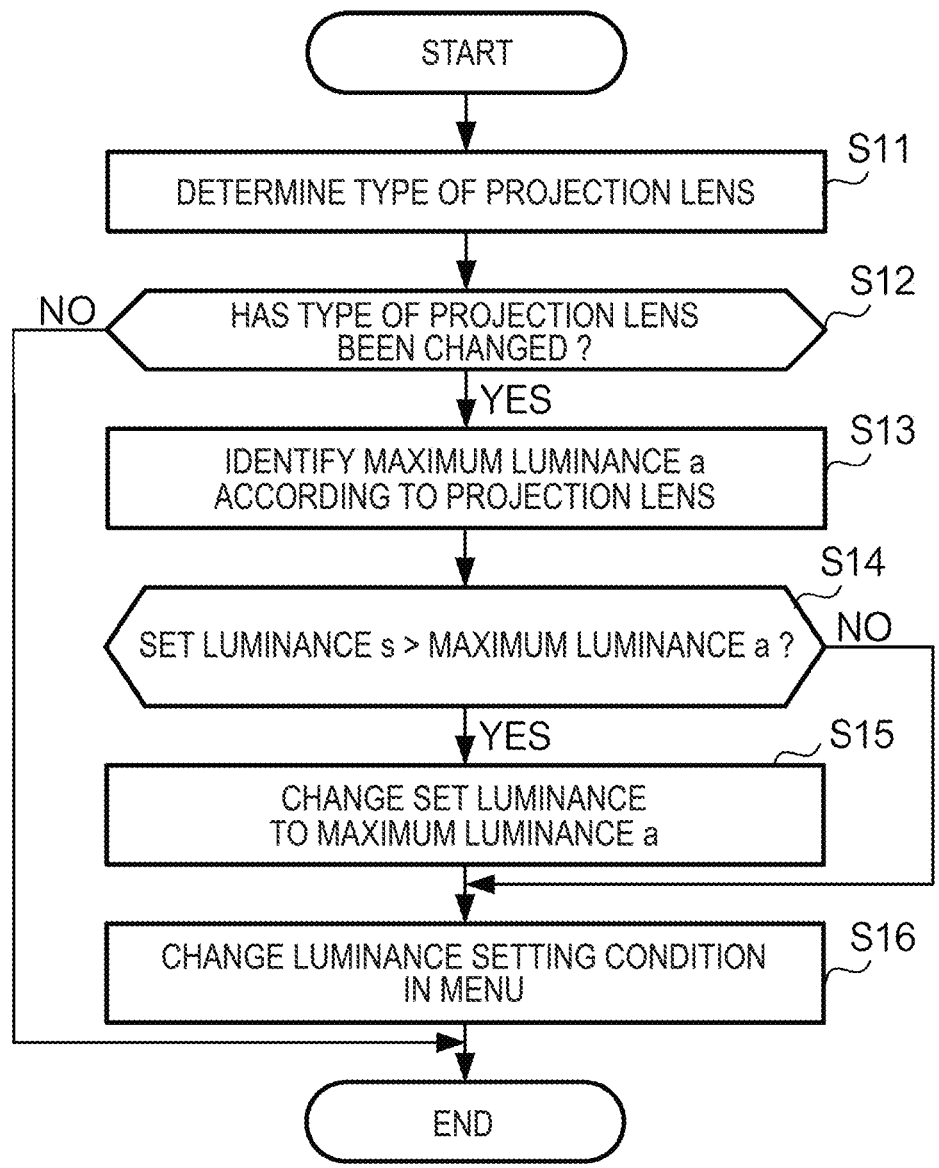
FIG. 3 is a flowchart showing the action of the projector.

The action of the projector 1 will next be described with reference to FIG. 3. The control section 11 starts the processes shown in FIG. 3 when the projector 1 is powered on or at any other timing. The control section 11 first determines the type of the projection lens 18 (step S11). For example, in a case where a projection lens 18 that complies with GPIO (general purpose input/output) or any other standard is connected to the projector 1, the control section 11 uses the standard to acquire the identifier of the projection lens 18 and determines the type of the projection lens 18 on the basis of the identifier. Instead, for example, in a case where a code (such as two-dimensional code) for type identification is attached to the projection lens 18, the control section 11 uses a camera provided as part of the projector 1 or connected thereto to read the code and decodes the code to determine the type of the projection lens 18. Still instead, for example, in a case where the user uses the operation section 14 to input the type of the projection lens 18, the control section 11 determines the type on the basis of the inputted content.

The control section 11 then compares the type of the projection lens 18 currently stored in the storage section 15 with the type of the projection lens 18 determined in step S11. In a case where the type has been changed (YES in step S12), the control section 11 overwrites the type of the projection lens 18 stored in the storage section 15 with a new one and refers to the luminance table stored in the storage section 15 to identify maximum luminance a (output from light source) corresponding to the type of the projection lens 18 determined in step S11 (step S13). In a case where the type of the projection lens has not been changed (NO in step S12), the entire process is terminated.

Thereafter, in a case where set luminance s in accordance with which the light source drive section 17 operates is greater than the maximum luminance a identified in step S13 (YES in step S14), the control section 11 sets the set luminance sin accordance with which the light source drive section 17 operates to be the maximum luminance a identified in step S13 (step S15). Specifically, the control section 11 stores the maximum luminance a identified in step S13 in the storage section 15 as the set luminance s in accordance with which the light source drive section 17 operates. The control section 11 does not instruct the light source drive section 17 to output light having luminance greater than or equal to the set luminance s stored in the storage section 15. That is, in a case where the output from (luminance of) the light source 16 set when the first projection lens is replaced with the second projection lens is greater than the second value, the control section 11 sets the output from (luminance of) the light source 16 at the second value. The set output from the light source 16 can thus be changed in accordance with the projection lens 18.

Further, the control section 11 sets the upper limit of the range of settable luminance values of the light source 16 to be the maximum luminance a identified in step S13 on a menu screen where the user sets the output from the light source 16 (step S16). For example, in a case where the maximum luminance a identified in step S13 corresponds to 70% within the range of possible luminance values of the light source 16 (0 to 100%), as shown, for example, in FIG. 4, the upper limit of the settable luminance range is set at 70% so that the user cannot set luminance greater than the upper limit. In the example shown in FIG. 4, the brightness level is set at 60%, and the 30% level corresponds to minimum brightness that allows image projection.

Figures 4, 5:
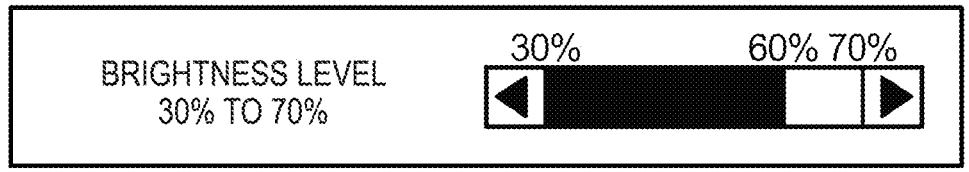
FIG. 4 shows an example of an image projected by the projector.
FIG. 5 shows a variation of the luminance table stored in the projector.

The control section 11 sets the maximum value of settable output from the light source 16 at the first value in the case where the projection lens 18 is the first projection lens and sets the maximum value of the settable output from the light source 16 at the second value in the case where the projection lens 18 is the second projection lens, as described above. As a result, on the menu screen where the output from the light source 16 is set, the maximum value of the settable output can be changed in accordance with the heat resistance performance of the projection lens 18. It is noted that the control section 11 carries out the process in step S16 also in a case where the set luminance s in accordance with which the light source drive section 17 operates is not greater than the maximum luminance a identified in step S13 (NO in step S14). Further, the operation area corresponding to brightness levels that the user cannot set may not be displayed, or the operation area may be grayed out so that the user cannot substantially operate the brightness levels in the area, as shown in FIG. 4 by way of example.

As described above, the control section 11 controls the light source drive section 17 in such away that the output from the light source 16 can be increased up to the first value in the case where the projection lens 18 is the first projection lens, whereas the control section 11 controls the light source drive section 17 in such a way that the output from the light source 16 can be increased up to the second value different from the first value in the case where the projection lens 18 is the second projection lens different from the first projection lens, whereby damage due to heat that occurs in a case where a projection lens having low heat resistance performance is used can be avoided.

3. Variations

The invention is not limited to the embodiment described above, and a variety of variations are conceivable. Some variations will be described below. Two or more of the following variations may be combined with each other and used.

The control section 11 may control the light source drive section 17 in such a way that the output from the light source 16 varies in accordance with the zoom ratio of the projection lens 18. In a case where the projection lens 18 has a small zoom ratio, the projection light has a wide light flux when passing through the projection lens 18, whereas in a case where the projection lens 18 has a large zoom ratio, the projection light has a narrow light flux when passing through the projection lens 18. As described above, in the case where the projection lens 18 has a large zoom ratio, the projection lens 18 has a small light transmission area, and the optical energy concentrates in the area, resulting in a large amount of generated heat. In this example, the storage section 15 stores a luminance table shown, for example, in FIG. 5. In the luminance table, maximum luminance of the light source (that is, output from light source) so set as not to cause damage due to heat is related to each zoom ratio on a projection lens type basis in consideration of the heat resistance performance of the projection lens operating at the zoom ratio. The control section 11 controls the light source drive section 17 in such a way that the output from the light source 16 can be increased up to the first value in a case where the projection lens 18 is a certain projection lens and the zoom ratio is a first ratio, whereas the control section 11 controls the light source drive section 17 in such a way that the output from the light source 16 can be increased up to the second value smaller than the first value in a case where the zoom ratio is a second ratio greater than the first ratio. The output from the light source 16 can therefore be changed also in accordance with the zoom ratio.

The hardware configuration of the projector 1 for achieving the functions shown in FIG. 1 by way of example is not limited to that shown in FIG. 1. The projector 1 may have any hardware configuration that allows the required functions to be achieved.

What is claimed is:
1. A projector comprising:
a light source that emits light;
a light source drive section that controls output from the light source;
a projection section that includes a projection lens through which the light passes and projects the light on a projection surface; and
a control section that controls the light source drive section in such a way that the output from the light source is allowed to be increased up to a first value in a case where the projection lens is a first projection lens and controls the light source drive section in such a way that the output from the light source is allowed to be increased up to a second value different from the first value in a case where the projection lens is a second projection lens different from the first projection lens, wherein
the first value represents a maximum luminance value that the light source can output without causing damage to the first projection lens due to heat, and
the second value represents a maximum luminance value that the light source can output without causing damage to the second projection lens due to heat.

2. The projector according to claim 1,
wherein the control section sets, on a menu screen where a user sets the output from the light source, a maximum value of settable output from the light source at the first value in the case where the projection lens is the first projection lens and sets the maximum value of the settable output from the light source at the second value in the case where the projection lens is the second projection lens.

3. The projector according to claim 1,
wherein in a case where the output from the light source having been set is greater than the second value when the first projection lens is replaced with the second projection lens, the control section sets the output from the light source at the second value.

4. The projector according to claim 1,
wherein the control section controls the light source drive section in such a way that the output from the light source varies in accordance with a zoom ratio of the projection lens.

5. A method for controlling a projector including a light source that emits light, a light source drive section that controls output from the light source, and a projection section that includes a projection lens through which the light passes and projects the light on a projection surface, the method comprising
controlling the light source drive section in such a way that the output from the light source is allowed to be increased up to a first value in a case where the projection lens is a first projection lens and controlling the light source drive section in such a way that the output from the light source is allowed to be increased up to a second value different from the first value in a case where the projection lens is a second projection lens different from the first projection lens,
wherein
the first value represents a maximum luminance value that the light source can output without causing damage to the first projection lens due to heat, and
the second value represents a maximum luminance value that the light source can output without causing damage to the second projection lens due to heat.

6. The projector according to claim 1,
wherein the control section further:
prevents a user from increasing the output of the light source above the first value when the projection lens is the first projection lens; and
prevents the user from increasing the output of the light source above the second value when the projection lens is the second projection lens.

7. The projector according to claim 1,
wherein the second value is smaller than the first value in a case where a heat resistance performance of the first projection lens is higher than a heat resistance performance of the second projection lens.

8. A projector comprising:
a light source that emits light;
a light source drive section that controls output from the light source;
a projection section that includes a projection lens through which the light passes and projects the light on a projection surface; and
a control section that controls the light source drive section in such a way that the output from the light source is allowed to be increased up to a first value in a case where the projection lens is a first projection lens and controls the light source drive section in such a way that the output from the light source is allowed to be increased up to a second value different from the first value in a case where the projection lens is a second projection lens different from the first projection lens,
wherein the second value is smaller than the first value in a case where a heat resistance performance of the first projection lens is higher than a heat resistance performance of the second projection lens.

* * * * *